United States Patent
Chen et al.

(10) Patent No.: US 7,301,698 B2
(45) Date of Patent: Nov. 27, 2007

(54) METHOD FOR AUTOMATICALLY ALIGNING TELESCOPE

(75) Inventors: Chin-Chuan Chen, Richmond (CA); Yan Liu, Richmond (CA)

(73) Assignee: Pacific Telescope Corp., Richmond (CA)

( * ) Notice: Subject to any disclaimer, the term of this patent is extended or adjusted under 35 U.S.C. 154(b) by 203 days.

(21) Appl. No.: 11/285,030

(22) Filed: Nov. 23, 2005

(65) Prior Publication Data

US 2007/0115545 A1    May 24, 2007

(51) Int. Cl.
    *G02B 23/00*    (2006.01)
(52) U.S. Cl. ........................ 359/399; 359/900
(58) Field of Classification Search ................ 359/399, 359/400, 401, 900
    See application file for complete search history.

(56) References Cited

U.S. PATENT DOCUMENTS 5,133,050 A * 7/1992 George et al. .............. 345/632
6,922,283 B2 * 7/2005 Baun et al. .................. 359/399

* cited by examiner

*Primary Examiner*—Alessandro Amari (57) ABSTRACT

A manual controller commands a telescope mount to automatically track a specific bright star after the image of the star is located to center of an electronic eyepiece and a timer is started. The average moving speed of the bright star is calculated after a predetermined elapsed time to acquire the right ascension (RA) and the declination (DEC) coordinates of this bright star. Subsequently, the RA and DEC coordinates are compared with pre-stored data contained within a database used to identify the bright star. The celestial sphere coordinates of the telescope can be determined after a minimum of one bright star is identified. In the auto-tracking procedure, the manual controller controls movement of telescope by feedbacks of the drifting speed and direction of the specific bright star in an electronic eyepiece for the purpose of keeping the specific bright star in the center of the electronic eyepiece.

17 Claims, 7 Drawing Sheets

METHOD FOR AUTOMATICALLY ALIGNING TELESCOPE

BACKGROUND OF THE INVENTION

1. Field of the Invention

The present invention relates to a method for automatically aligning an astronomical telescope, specifically to a method for automatically aligning a telescope with feedback control. A motor speed is controlled so as to track a bright star and the coordinates of the telescope.

2. Description of Prior Art

Figure 1:
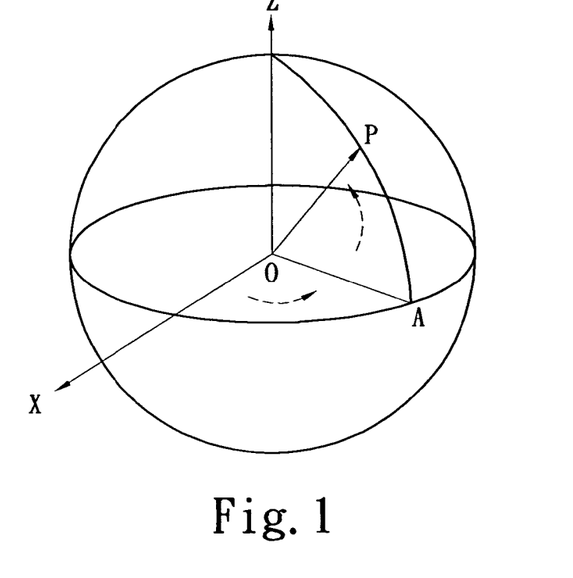
FIG. 1 shows the schematic diagram of a spherical polar coordinate.
Figure 2:
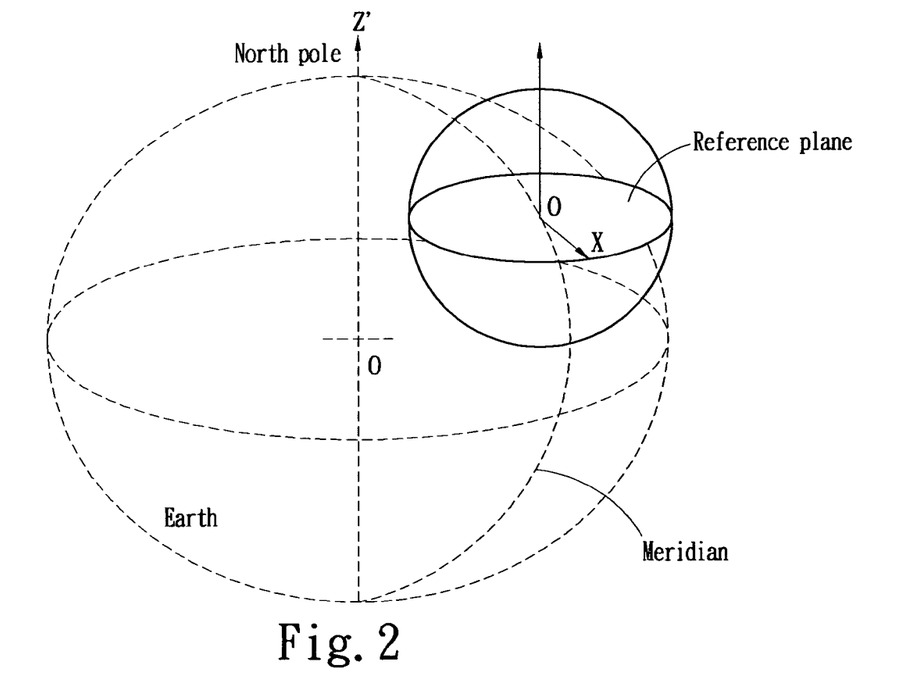
FIG. 2 shows the schematic diagram of an altitude and azimuth coordinate.

The celestial bodies can be represented by a spherical polar coordinate on the sky. FIG. 1 shows the schematic diagram of a spherical polar coordinate with polar axis OZ, wherein the reference plane is the XOA plane vertical to the polar axis OZ and OX is a reference direction on the reference plane. The projection of OP on the reference plane is indicated by OA. Therefore, a celestial body P can be represented by the angle XOA and the angle AOP, as shown in FIG. 1.

The most common sphere coordinates include celestial sphere coordinates, and altitude and azimuth coordinates, which are described below.

The Celestial Sphere Coordinate

In the celestial sphere coordinate, the observer on earth is located at sphere center O and the polar axis OZ is an axis parallel to the rotation axis O'Z' of the Earth and the position direction is the direction of north celestial pole. The reference plane is a plane passing the center O and vertical to the polar axis. The reference direction OX on the reference plane is the intersecting line of the celestial meridian plane of the location of the observer on the Earth and the reference plane. The positive direction is the direction pointing from the rotation axis of the Earth toward the observer.

The Altitude and Azimuth Coordinate

In the altitude and azimuth coordinate, the observer is located at the center O and the reference plane XOA is a horizontal plane (the tangential plane to the surface of the Earth) normal to the observer. The reference direction OX on the reference plane is south and the positive direction of polar axis OZ is to the Zenith.

The Telescope Mount, the Telescope Coordinate System and Az-Alt Telescope Mount

In general, the telescope mount is a mechanical system defined by two orthogonal rotational axes. The pointing direction of the telescope can be represented by the angle formed by two of the rotational axes. This is also a spherical coordinate system and is referred to as telescope coordinate system.

Provided that a rotational axis of the telescope mount is coincidental with a polar axis of the altitude and azimuth coordinate, the telescope mount is referred to as an Alt-Az telescope mount. The rotational axis pointing to the Zenith is referred to as the Az (Azimuth)axis, the rotational axis parallel to the ground level is referred to as the Alt (Altitude) axis. The reference plane of the Alt-Az telescope mount is parallel to the horizontal plane.

The Representation of Celestial Objects in Different Coordinates

The coordinate of a celestial object in celestial sphere coordinate can be transformed to the altitude and azimuth coordinates (or the telescope mount coordinate system) by coordinate transform, as shown to FIG. 1.

In celestial sphere coordinates, angle XOA=$\alpha$ and angle AOP=$\beta$;

In altitude and azimuth coordinates, angle XOA=$\alpha'$ and angle AOP=$\beta'$;

the angles have following relationship:

$$\begin{bmatrix} \cos\alpha\cos\beta \\ \sin\alpha\cos\beta \\ \sin\beta \end{bmatrix} = [M] \times \begin{bmatrix} \cos\alpha'\cos\beta' \\ \sin\alpha'\cos\beta' \\ \sin\beta' \end{bmatrix}$$

GOTO Telescope

The GOTO telescope is a motor driven and computer-based telescope. One basic function of the GOTO telescope is to convert a coordinate A($\alpha$, $\beta$) in celestial sphere coordinates to a coordinate A'($\alpha'$, $\beta'$) in telescope mount coordinates. The mount is controlled to move from an initial arbitrary position to the coordinate A'(equivalent to the coordinate A), whereby the celestial object at coordinate A appears on field of view in the telescope.

Alignment of GOTO Telescope

To precisely locate the target, the GOTO telescope requires alignment, which comprises following steps:

1. The GOTO telescope points to a first position in the sky and the celestial sphere coordinate ($\alpha_1$, $\beta_1$) and the telescope mount coordinate ($\alpha_{1'}$, $\beta_{1'}$) associated with the first position are recorded.

2. The GOTO telescope points to a second position in the sky and the celestial sphere coordinate ($\alpha_2$, $\beta_2$) and the telescope mount coordinate ($\alpha_{2'}$, $\beta_{2'}$) associated with the second position are recorded.

3. The GOTO telescope points to a third position in the sky and the celestial sphere coordinate ($\alpha_3$, $\beta_3$) and the telescope mount coordinate ($\alpha_{3'}$, $\beta_{3'}$) associated with the third position are recorded.

4. The conversion relationship between celestial sphere coordinates and telescope mount coordinates can be determined by following formula:

$$[M] = \begin{bmatrix} \cos\alpha 1\cos\beta 1 & \cos\alpha 2\cos\beta 2 & \cos\alpha 3\cos\beta 3 \\ \sin\alpha 1\cos\beta 1 & \sin\alpha 2\cos\beta 2 & \sin\alpha 3\cos\beta 3 \\ \sin\beta 1 & \sin\beta 2 & \sin\beta 3 \end{bmatrix} \times \begin{bmatrix} \cos\alpha 1'\cos\beta 1' & \cos\alpha 2'\cos\beta 2' & \cos\alpha 3'\cos\beta 3' \\ \sin\alpha 1'\cos\beta 1' & \sin\alpha 2'\cos\beta 2' & \sin\alpha 3'\cos\beta 3' \\ \sin\beta 1' & \sin\beta 2' & \sin\beta 3' \end{bmatrix}^{-1}$$

where the telescope mount coordinates ($\alpha_{1'}$, $\beta_{1'}$), ($\alpha_{2'}$, $\beta_{2'}$), ($\alpha_{3'}$, $\beta_{3'}$) can be obtained through the motor control system of the mount; and the method for obtaining the celestial sphere coordinates ($\alpha_1$, $\beta_1$), ($\alpha_2$, $\beta_2$), ($\alpha_3$, $\beta_3$) will be detailed below.

How to Obtain the Celestial Sphere Coordinates

Most stars in the sky are documented by relative positions in a celestial objects database, wherein the coordinates of a celestial body in the database are represented by right ascension (RA) and declination (DEC) and RA and DEC are angular coordinates.

Provided that the date and time T0 at zero-degree longitude is known, the Sidereal Time at Greenwich meridian, labeled as LST0, can be calculated and the calculation is omitted here for clarity.

Provided that the longitude of user location is L, the celestial object with known (Ra, Dec) can be expressed in term of HA (hour angle, which is equivalent to angle XOA in FIG. 1) and Dec (equivalent to angle AOP in FIG. 1) with reference to the celestial sphere coordinates of the observer. The hour angle HA can be calculated according to the following formula:

$$HA = LST0 - L - Ra$$

Therefore, the alignment of the GOTO telescope is first performed by pointing the GOTO telescope to three stars, which are referred to as alignment stars. The corresponding RA and DEC data for those alignment stars can be obtained from a database and the celestial sphere coordinates $(\alpha_1, \beta_1)$, $(\alpha_2, \beta_2)$, $(\alpha_3, \beta_3)$ for the telescope can be determined using the longitude and the current local time of the observer.

Difficulty in Identifying Alignment Star

As can be seen in above description, one essential step in aligning the GOTO telescope is pointing the GOTO telescope at an alignment star. However, an error will occur if the coordinates for star A in the database are used, but the actual star pointed at by the GOTO telescope is star B.

Unfortunately, for novice astronomer, this error can happen easily, which might be caused by their unfamiliarity with name or number of the alignment star or erroneous pointing of the GOTO telescope.

SUMMARY OF THE INVENTION

The present invention is intended to provide a method for automatically aligning a telescope, wherein the speed of a star is obtained through feedback controlling a motor to track the star.

Accordingly, the present invention provides a method for automatically aligning a telescope. The telescope comprises a motor controller to move a telescope mount, an electronic eyepiece, a manual controller electrically connected to the motor controller and the electronic eyepiece. The manual controller comprises a built-in celestial objects database. After an image of a star is located in center of the electronic eyepiece, the manual controller recording a coordinate of the image and commands the telescope mount to automatically track the star and activating a timer T0. After a preset time is reached by the timer T0, a duration for the image of the star being moved back to the original coordinate is obtained and an average speed of the star is calculated. The right ascension and declination information for the star are calculated according to the average speed of the star. The align star is identified by comparing the calculated right ascension and declination information with bright stars information stored in the celestial objects database. In the process of commanding telescope mount to automatically track the align star, the manual controller determines the drift amount and a direction of the image of the star in the electronic eyepiece through communication with the electronic eyepiece and keeping the image of the align star in center of the electronic eyepiece by feedback controlling an Alt motor and an Az motor.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 3:
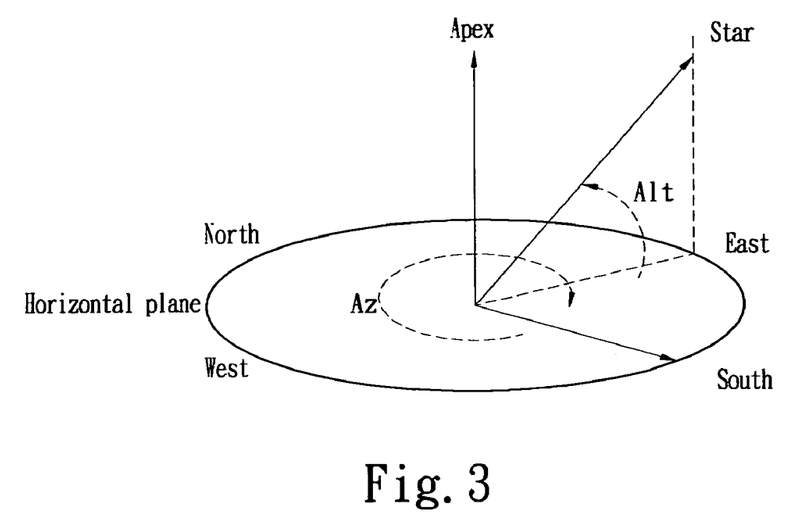
FIG. 3 shows a star in the altitude and azimuth coordinate.

The altitude and azimuth coordinate of a star can be determined by the moving speed of the star in the altitude and azimuth coordinate. FIG. 3 shows the altitude and azimuth coordinate, wherein the position of the star can be represented by azimuth angle Az and altitude angle Alt, wherein the starting direction of the azimuth angle Az is south and the axis of rotation moving from south to west is the positive direction with an angular measurement range of −180 to +180 degrees. The starting direction of the altitude angle Alt is the horizontal plane, and the axis of rotation moving from the horizontal plane to Zenith is the positive direction with an angular measurement range of 0 to 90 degrees.

In the altitude and azimuth coordinate, the position change of the star is due to the rotation of the Earth and the speed of movement of the star can be expressed as using the following:

$$Az' = V_0(\sin Lat + \tan Alt \cos Az \cos Lat)$$

$$Alt' = -V_0 \sin Az \cos Lat \quad (1)$$

where Az' is the rotational speed of the star along the azimuth direction Az, and Alt' is the rotational speed of the star along the altitude direction Alt. Lat is the latitude of the observer, Az is azimuth angle, Alt is altitude angle and V0 is the angular speed of the Earth.

The formula 1 can be rewritten as $$Az = -\sin^{-1}(Alt'/V_0/\cos Lat)$$

$$Alt = \tan^{-1}((Az'/V_0 - \sin Lat)/\cos Az/\cos Lat) \quad (2)$$

As can be seen from formula 2, the altitude and azimuth coordinate can be determined by the rotation speed (Az',Alt') of a star in altitude and azimuth coordinates.

In formula 2 above, the range of Az can be determined as follows. The range of Az should be −90 to +90 degrees, when the star is in the south hemisphere. The range of Az should be 90 to 180 degrees or −180~−90 degree, when the star is in north semi-sphere. Moreover, with reference to formula 1, the star is in east semi-sphere when Alt'>0; the star is in west semi-sphere when Alt'<0. Therefore, when the star is at west-south direction, the range of Az is 0 to 90 degrees. When the star is at west-north direction, the range of Az is 90 to 180 degrees. When the star is at east-north direction, the range of Az is −180 to −90 degrees. When the star is at east-south direction, the range of Az is −90 to 0 degrees.

In other word, the star should be determined to be in the southern hemisphere or in northern hemisphere of the sky before determining the Az/Alt coordinate according to the formula 2. In practice, this is easy to determine.

In most applications, the range of angle Alt will be between 0 and 90 degrees.

Transformation from Az/Alt coordinates to celestial sphere coordinates

Figure 4A:
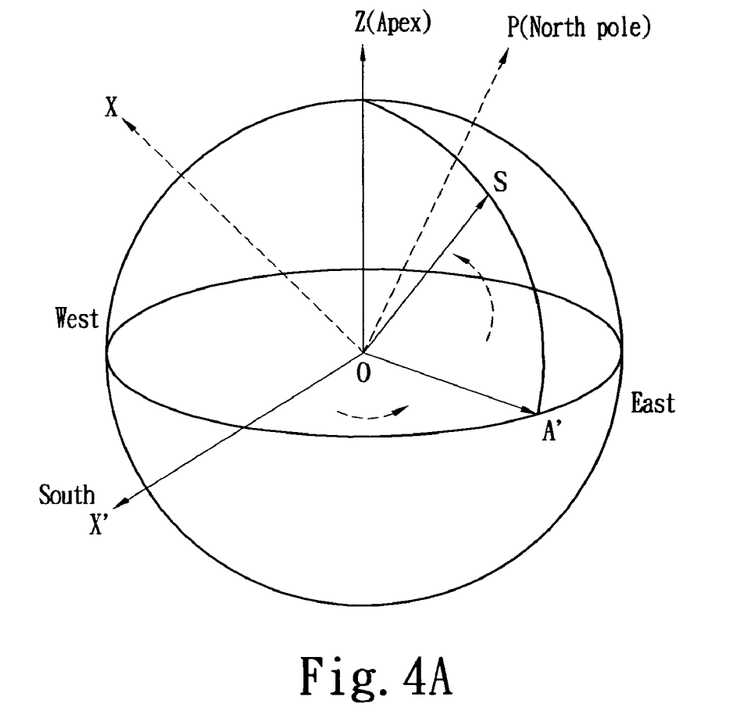
FIG. 4A shows the coordinate transform for the altitude and azimuth coordinate.
Figure 4B:
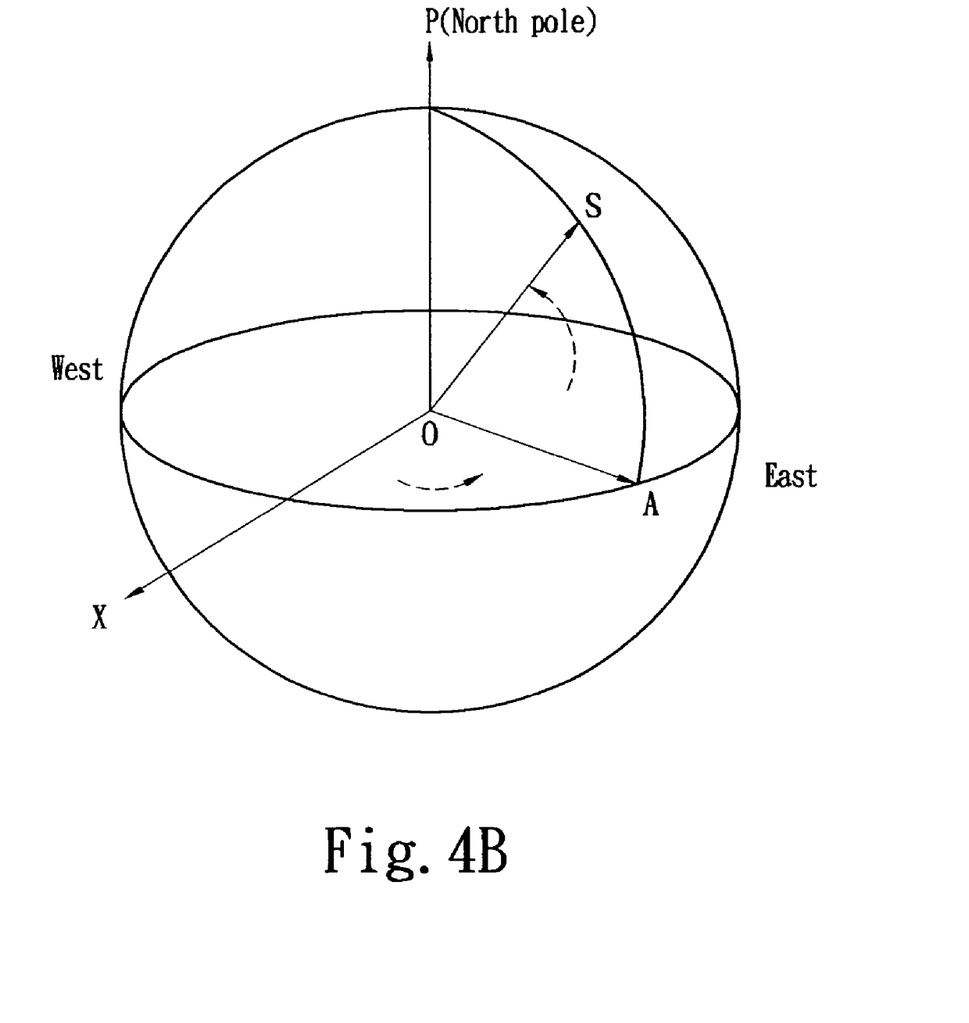
FIG. 4B shows the coordinate transform for the celestial sphere coordinate.

With reference to FIGS. 4A and 4B, the symbol O is the common center in both coordinates, XOP is coplanar with X'OZ and is the meridian plane. The direction OX' points to the south, the direction OS points to a celestial body, the direction OA' is the projection of OS on horizontal plane and OA is the projection of OS on celestial reference plane.

With reference to FIG. 4A, in the Az/Alt coordinate,
azimuth angle Az=/X'OA, and altitude angle Alt=/A'OS
With reference to FIG. 4B, in the celestial sphere coordinate,
Hour angle HA=/XOA, and declination angle DEC=/AOS OX' is the reference position of Az, the axis of rotation from south to west is the positive direction and the range of Az is between −180 and +180 degrees.

X'OA is reference plane of Alt and the direction toward Zenith is positive direction, the range of Alt is between −90 and +90 degree.

OX is reference position of HA, the axis of rotation from south to west is the positive direction and the range of HA is between −180 and +180 degrees.

XOA is reference plane of DEC and the axis of rotation from the horizontal plane to the north pole is the positive direction, the range of DEC is between −90 and +90 degrees.

The following relationship is adhered to in above definition:

$$HA = \tan^{-1}\left(\frac{SinAz}{cosAzsinLat + tanAltcosLat}\right) \quad (3)$$

$$DEC = \sin^{-1}(sinLatsinAlt - cosLatcosAltcosAz)$$

In formula 3, the range of HA should be consistent with the range of Az in calculation of the value of the inverse trigonometric function.

Identifying Bright Stars

After calculating the celestial sphere coordinate (HA, DEC), the celestial body coordinate database (Ra/Dec) for the celestial object pointed by OS can be calculated using the current local time and longitude of the observer. The celestial object can be identified by reference to the celestial body coordinate database (Ra/Dec).

However, an error may be present in measurement, and the calculated Ra/Dec coordinate may not be correct. It is preferably to identify bright stars such as stars brighter than apparent magnitude 2.2. These stars are not plentiful in sky and a database for those brighter stars can be easily created from existing databases.

Applying the Identified Star to Align the GOTO Telescope

We can precisely obtain RA/DEC data for the align star and the celestial sphere coordinates $(\alpha_1, \beta_1), (\alpha_2, \beta_2), (\alpha_3, \beta_3)$ pointed at by the telescope can be determined with reference to local longitude and the current local time of the observer. Those information can be used to align telescope.

Identifying Bright Planets

In the sky, the planets such as Venus, Jupiter, Mercury, Mars and Saturn are also very bright. Their current RA/DEC data can be calculated by reference to current local time of the observer. Therefore, those planets can also be identified.

Figure 5:
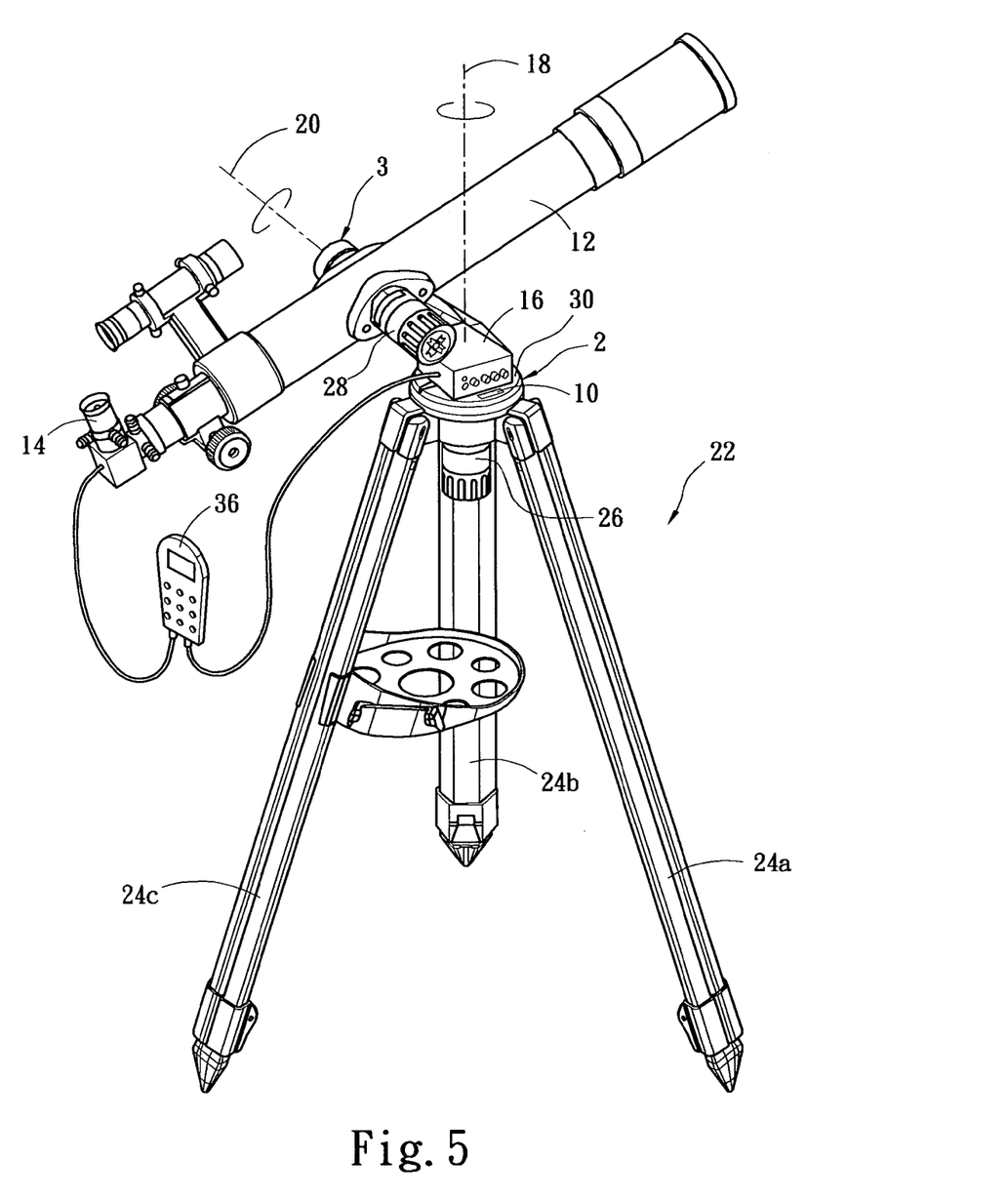
FIG. 5 shows the telescope according to a preferred embodiment of the present invention.

FIG. 5 shows the telescope 100 according to a preferred configuration of the present invention, which can bean Az-Alt telescope in this preferred embodiment. The Az-Alt telescope is comprised of an optical tube 12 (a refractive type telescope is shown in this figure, however, the present invention can be applied to reflective type telescopes as well), an Az motor 26 used to drive an Az joint 2 with Az shaft 18, an arm 1 used to support the optical tube 12 and motor assembly 28 (the arm 1 is fixed to the Az joint 2 and rotating with the Az joint 2), tripod legs 24a, 24b, 24c with telescoping ends, wherein the tripod legs 24a, 24b, 24c are used to level base assembly by adjusting their length with respect to a duel axis bubble level 10 in the Az joint 2 to align the Az shaft 18 to be vertical to horizontal plane, a motor controller 16 is electrically connected to the motor assemblies 26 and 28 through conductive wires to receive motor movement angle, a manual controller 36 connected to the motor controller 16 to control the motor speed by commands issued by the manual controller 36, thus controlling the motor movement and reporting motor current location to the manual controller 36.

Additionally, the telescope 100 further comprises an electronic eyepiece 14 such as a digital camera with a CCD/CMOS sensing matrix. The electronic eyepiece 14 is electronically connected to the manual controller 36 for reading the coordinates of the star within the CCD/CMOS sensing matrix. The electronic eyepiece 14 further comprises a tiny rectangular LCD screen with horizontal direction and vertical direction indicating X and Y directions of the CCD/CMOS sensing matrix, respectively. Each of the motor assemblies 26 and 28 comprises motor, decelerating gearbox and motor movement sensor.

Figure 6:
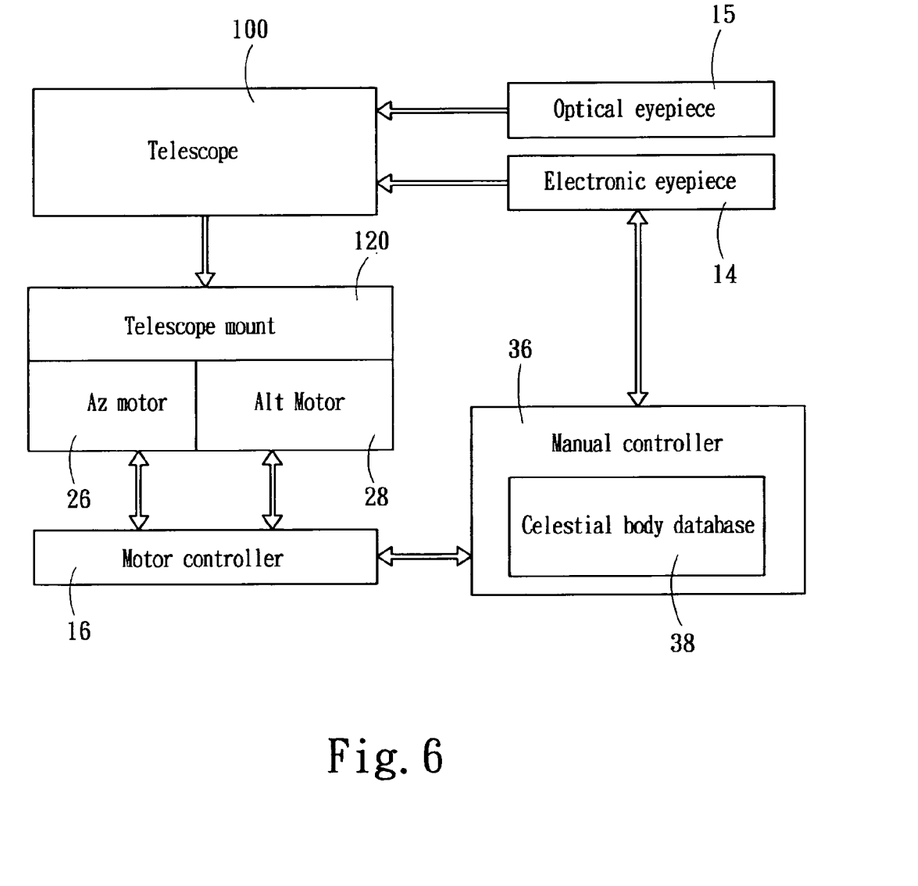
FIG. 6 shows the elements related to telescope operation.

FIG. 6 shows the elements related to telescope operation. The telescope 100 is arranged on a telescope mount 120 and the motor controller 16 controls the Az motor assembly 26 and the Alt motor assembly 28 linked with the telescope mount 120 to control the movement of the telescope 100. The telescope 100 comprises an ocular 15 and an electronic eyepiece 14. The manual controller 36 is electrically connected to the electronic eyepiece 14 and the motor controller 16 and the manual controller 36 contains a celestial body database 38. The motor controller 16 is connected to motor assembly to control the motor and receive electronic signals sending from a position encoder on the motor. Therefore, its connection is shown by bidirectional arrows. The manual controller 36 is communicates with the motor controller 16. The manual controller 36 sends commands to the motor controller 16 such as moving to designated location (coordinate) or moving with observer specified speed and direction. The manual controller 36 also obtains information from the motor controller 16 such as the position of motor axis and telescope axis. The manual controller 36 communicates with the electronic eyepiece 14 and controls certain operation of the electronic eyepiece 14 such as exposure time. The manual controller 36 can also obtain the star coordinates on the detector chip of the electronic eyepiece 14.

Figure 7A:
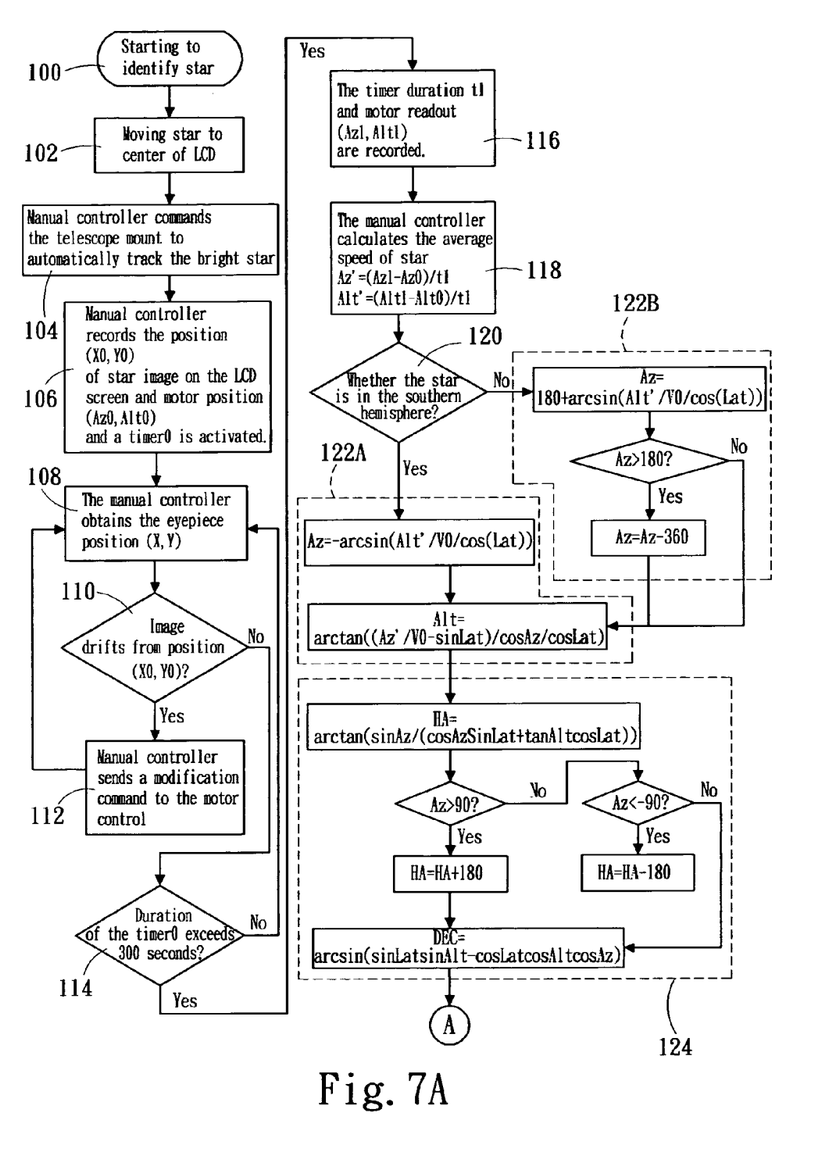
FIG. 7 shows the flowchart according to the method of the present invention.
Figure 7B:
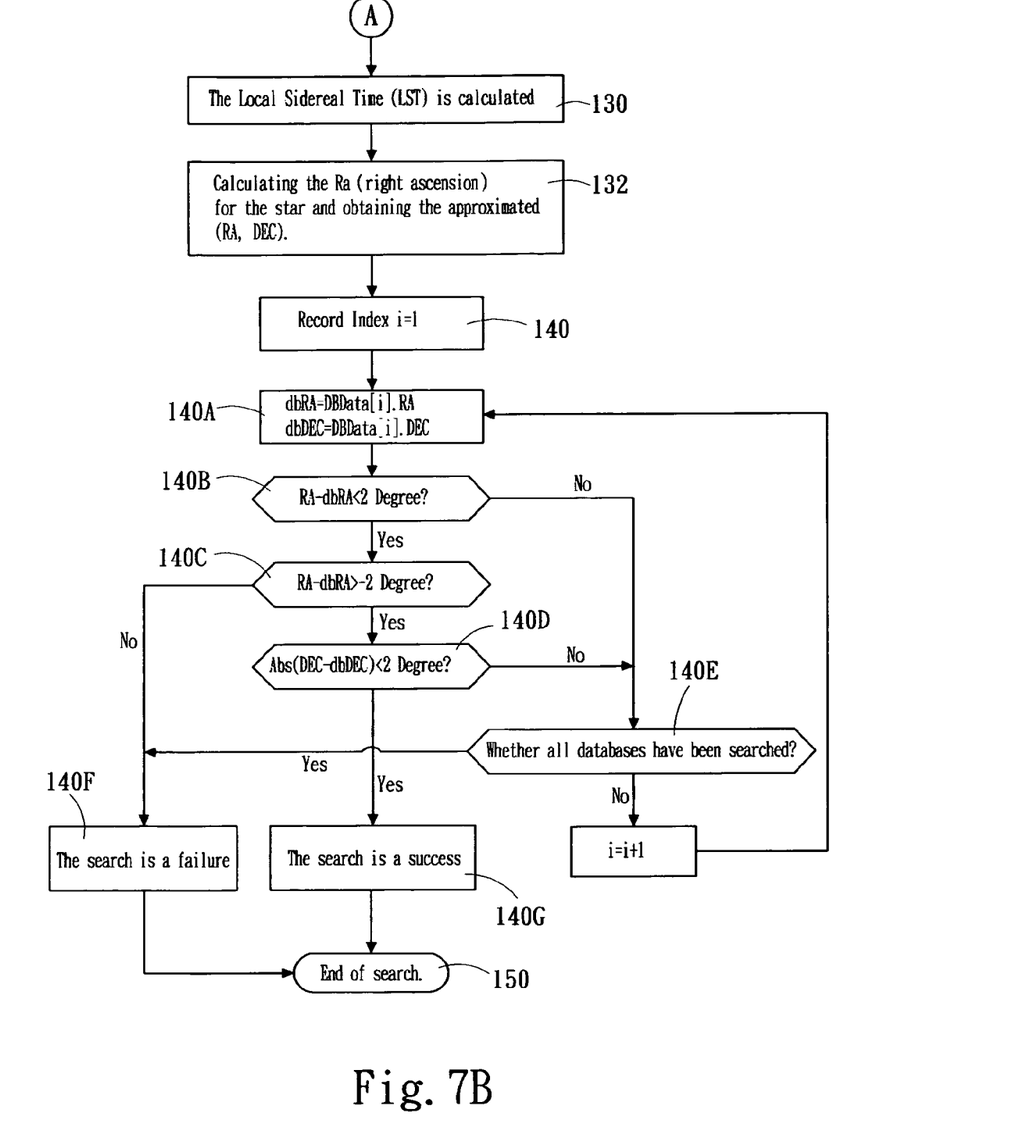

FIG. 7 shows the flowchart according to the method of the present invention, which comprises following steps:

Step 100: Starting to identify star. Using horizontal bubble level 10 to adjust tripod legs 24a, 24b, 24c such that the wheel 30 on the Az joint 2 is level. Using the manual controller 36 to input local longitude, local altitude and modifying the real time clock of the manual controller 36 to the current local time of the observer.

Step 102: Using the manual controller to aim the telescope 12 to a bright star and adjusting the focuser position of the telescope 12 such that the image of the bright star appears on center of LCD of the electronic eyepiece 14 and in the smallest possible image size of the star. The electronic eyepiece 14 is adjusted such that the star image moves along horizontal axis of the LCD screen when the Az shaft 18 rotates and the star image moves along vertical axis of the LCD screen when the Alt shaft 20 rotates. The manual controller 36 adjusts the telescope 12 to locate the star image on center of LCD screen.

Step 104: The manual controller 36 commands the telescope mount to automatically track the bright star.

Step 106: The manual controller 36 records the position (X0, Y0) of star image on the LCD screen and motor position (Az0, Alt0) and a timer0 is activated.

Step 108: The manual controller 36 obtains the electronic eyepiece position (X, Y) for the star through communication with the electronic eyepiece 14.

Step 110: Determining the image displacement off position (X0, Y0).

Step 112: When the image star is has moved from the center of the LCD screen, the manual controller 36 sends a modification command to the motor control and the manual controller 36 determines the drift amount and direction of the star in the electronic eyepiece 14 through the communication with the electronic eyepiece 14. Next, the Alt motor and Az motor speeds are controlled through feedback control such that the star image is kept to initial location in the LCD screen.

Step 114: Determining whether the duration of the timer exceeds a preset time such as 300 seconds. If not, the procedure goes back to step 108, else step 116 is performed.

Step 116: When the duration of the timer exceeds 300 seconds, longer tracking times are used when higher precision is desired, the manual controller 36 reads the duration when the star image overlaps with (X0, Y0), and the timer duration t0 and motor readout (Az1, Alt1) are recorded.

Step 118: The manual controller 36 calculates the average speed of star within duration t0 by the following formula:

$$Az' = (Az1 - Az0)/t0$$

$$Alt' = (Alt1 - Alt0)/t0$$

Step 120: Determining whether the star is in the southern hemisphere.

Step 122A: The manual controller 36 calculates the approximate altitude and azimuth coordinate (Az, Alt) according to formula 2 if the star is in the southern hemisphere.

Step 122B: The manual controller 36 calculates the approximate altitude and azimuth coordinate (Az, Alt) according to a modified formula if the star is not in the southern hemisphere.

Step 124: The manual controller 36 calculates the approximate celestial sphere coordinates (HA, DEC) according to formula 3.

Step 130: The Local Sidereal Time (LST) is calculated based on the known longitude and the duration t0.

Step 132: Calculating the REC (right ascension) for the star and obtaining the approximated (RA,DEC).

Step 140: Initialization of the (RA, DEC) coordinates data base.

Step 140A-G: The manual controller 36 uses the above approximated (RA, DEC) to identity the bright star within a smaller range in a bright-star database contained in the manual controller 36. The right ascension (Ra) and declination (Dec) of the identified bright star is recorded as (Ra1, Dec1). The bright-star database above contained in the manual controller 36 is referred to as all stars with an apparent magnitude 2.2 or less and bright planets such as Venus, Jupiter, Mercury, Mars and Saturn.

In detail, step 140A-G comprises of following sub-steps:

Step 140A: Reading data item i and setting its value as (dbRA, dbDEC).

Step 140B: Determining whether the right ascension (Ra) of the star is larger than the (Ra) contained in the bright star database (dbRA) by a predetermined amount, such as 2 degrees.

Step 140C: Determining whether the right ascension (Ra) of the star is smaller than the (Ra) contained in the bright star database (dbRA) by a predetermined amount, such as 2 degrees.

Step 140D: Determining whether the declination (Dec) of the star is deviated from the (Dec) contained in the bright star database (dbDEC) by a predetermined amount, such as 2 degrees.

Step 140E: Determining whether all databases have been searched.

Step 140F: The search is a failure when all database have been searched and the results in sub-steps 140B-140D are negative.

Step 140G: The search is a success when the results in sub-steps 140B-140D are positive.

Step 150: End of search.

The manual controller 36 uses (Ra1,Dec1), the local longitude and the current local time of the observer to precisely calculate the celestial sphere coordinate $(\alpha_1, \beta_1)$. The manual controller 36 then uses the following formula to calculate the Altitude and Azimuth Coordinates $(\alpha_1', \beta_1')$ based on local latitude:

$$\alpha 1' = \tan^{-1}\left(\frac{\sin\alpha 1}{\cos\alpha 1 \sin Lat - \tan\beta 1 \cos Lat}\right)$$

$$\beta 1' = \sin^{-1}(\sin Lat \sin\beta 1 + \cos Lat \cos\alpha 1 \cos\beta 1)$$

Note: The value of $\alpha_1$ can be used to identify the star in the east or west and then the value range of $\alpha_{1'}$ can be determined, the range of $\beta_{1'}$ is 0 to −90 degrees.

The manual controller 36 sets the Az motor position in the motor controller 16 to $\alpha_{1'}$ and sets the Alt motor position to $\beta_{1'}$ to align the telescope coordinates and the Az-Alt coordinates. Afterward, the manual controller 36 records the $(\alpha_1, \beta_1)$ and $(\alpha_{1'}, \beta_{1'})$ as first data to align the GOTO telescope.

In the method of the present invention, it is not necessary to use three stars to get the coordinate transform relationship. Only using one star can also result in a successful alignment. The method used to identify the second star will be explained below.

The manual controller 36 selects a second bright star from the database and records the RA (right ascension) and DEC (declination) of it as (RA2, DEC2).

The celestial sphere coordinate $(\alpha_1, \beta_1)$ and the Altitude and Azimuth Coordinate $(\alpha_{1'}, \beta_{1'})$ for the second star are calculated.

The manual controller 36 commands the motor to move to the position $(\alpha_{2'}, \beta_{2'})$ and the second align star will appear in the field of view of the telescope. The manual controller 36 commands the motor to move the second align star to the center of the electronic eyepiece. The manual controller 36 acquires the position of Az motor and changes $\alpha_{2'}$ to this value, the manual controller 36 acquires the position of Alt motor and changes $\beta_{2'}$ to this value. Then, the second set of data $(\alpha_2, \beta_2)$ and $(\alpha_{2'}, \beta_{2'})$ can be determined. Next, the manual controller 36 acquires the current local time of the observer and uses this current local time to recalculate the HA2 for the second star and changes value $\alpha_2$ to the value of HA2. Therefore, the second set of data $(\alpha_2, \beta_2)$ and $(\alpha_{2'}, \beta_{2'})$ can be obtained.

The third set of data $(\alpha_3, \beta_3)$ and $(\alpha_{3'}, \beta_{3'})$ for the GOTO telescope can also be obtained in a similar way.

Afterward, the manual controller 36 uses the three sets of data $(\alpha_1, \beta_1)$, and $(\alpha_{1'}, \beta_{1'})$, $(\alpha_2, \beta_2)$ and $(\alpha_{2'}, \beta_{2'})$, $(\alpha_3, \beta_3)$ and $(\alpha_{3'}, \beta_{3'})$ to calculate the transform matrix (M) between the celestial sphere coordinate $(\alpha_1, \beta_1)$ and the telescope mount coordinate $(\alpha', \beta')$.

An RA (right ascension)/DEC (declination) coordinate for a celestial body is inputted directly using the manual controller 36 or selected from the database contained in the manual controller 36. The manual controller 36 then commands the telescope to point to the celestial body with the specific RA/DEC automatically. It should be noted that using data for one star can also achieve alignment of telescope according to the present invention.

Although the present invention has been described with reference to the preferred configuration thereof, it will be understood that the invention is not limited to the details thereof. Various substitutions and modifications have suggested in the description contained within, and configurations that may be used with this invention may be devised by individuals with common skill in the art. Therefore, any such substitutions and modifications are intended to be embraced within the scope of the invention as defined in the appended claims.

What is claimed is:

1. A method for automatically aligning a telescope, the telescope comprising a motor controller to move a telescope mount, an electronic eyepiece and a manual controller electrically connected to the motor controller and the electronic eyepiece, the manual controller comprising a built-in celestial objects database, the method comprising the steps of:

after an image of a star is centered in the electronic eyepiece, the manual controller recording a coordinate (x0, y0) of the image and commanding the telescope mount to automatically track the star and activating a timer T0;

after a predetermined time is reached by the timer T0, a duration for the image of the star returning to the coordinate (x0, y0) and thus calculating an average speed of the star;

calculating right ascension (RA) and declination (DEC) information for the star according to the average speed of the star; and identifying the star by comparing the right ascension and declination information with the information for this bright star stored in the celestial objects database.

2. The method as in claim 1, wherein the predetermined time is 300 seconds.

3. The method as in claim 1, wherein in the process of the manual controller commanding the telescope mount to automatically track the star, the manual controller determining an amount of drift and a direction of the image of the star in the electronic eyepiece through communication with the electronic eyepiece while keeping the image of the star centered in the electronic eyepiece by feedback controlling an Alt (Altitude) motor and an Az (Azimuth) motor.

4. The method as in claim 1, further comprising the step of:

determining whether the star is at southern hemisphere.

5. The method as in claim 1, further comprising the step of:

determining an approximated Az (Azimuth)/Alt (Altitude) coordinate for the star.

6. The method as in claim 5, further comprising the step of:

determining an approximated celestial sphere coordinate (RA, DEC) for the star.

7. The method as in claim 6, further comprising the step of:

calculating a local sidereal time LST at time t0 based on a known longitude and current local time of an observer, and then calculating the approximated celestial sphere coordinate (RA, DEC) for the star.

8. The method as in claim 1, wherein the celestial objects database stores right ascension and declination information for stars brighter than apparent magnitude 2.2.

9. The method as in claim 1, wherein the celestial objects database stores right ascension and declination information at current local time of an observer for planets including Venus, Jupiter, Mercury, Mars and Saturn.

10. The method as in claim 1, wherein the star is identified as a bright star when a difference between the right ascension and declination of the star and right ascension and declination of one bright star of the celestial objects database is within 2 degrees.

11. A method for automatically aligning a telescope, the telescope comprised of a motor controller to move a telescope mount, an optical eyepiece, and a manual controller with a built-in celestial objects database electrically connected to the motor controller, the method comprising the steps of:

after a star is centered in the optical eyepiece, the manual controller recording a first position reading from the motor controller and commanding the telescope mount to automatically track the star and activate a timer T1;

after a predetermined duration counted by the timer T1, the manual controller bringing back the star to center of the optical eyepiece and registering a second position reading from the motor controller and then calculating an average speed of the star based on a readout difference of the motor controller;

calculating a coordinate in right ascension and declination for the star according to the average speed of the star; and identifying the star by comparing the calculated coordinate in right ascension (RA) and declination (DEC) to a bright star information stored in the celestial objects database.

12. The method as in claim 11, further comprising the step of:

determining whether the star is at southern hemisphere.

13. The method as in claim 11, further comprising the step of:

determining an approximated Az (Azimuth)/Alt (Altitude) coordinate for the star.

14. The method as in claim 13, further comprising the step of:

determining an approximated celestial sphere coordinate (RA, DEC) for the star.

15. The method as in claim 14, further comprising the step of:

calculating a local sidereal time LST at time t0 based on local longitude and current local time of an observer, and then calculating the approximated celestial sphere coordinate (RA, DEC) for the star.

16. The method as in claim 11, wherein the celestial objects database stores coordinates in right ascension and declination for all stars brighter than apparent magnitude 2.2.

17. The method as in claim 11, wherein the celestial objects database stores coordinates in right ascension and declination at current local time of an observer for planets including Venus, Jupiter, Mercury, Mars and Saturn.

* * * * *